US012655001B2

(12) United States Patent

Yu et al.

(10) Patent No.: US 12,655,001 B2
(45) Date of Patent: Jun. 16, 2026

(54) VEHICLE WINCH AND VEHICLE HAVING VEHICLE WINCH

(71) Applicant: T-MAX (HANGZHOU) TECHNOLOGY CO., LTD., Zhejiang (CN)

(72) Inventors: Hangfei Yu, Zhejiang (CN); Haojia Chen, Zhejiang (CN); Haibin Chen, Zhejiang (CN); Shipei Yao, Zhejiang (CN); Xuebo Hu, Zhejiang (CN); Senbiao Ge, Zhejiang (CN)

(73) Assignee: T-MAX (HANGZHOU) TECHNOLOGY CO., LTD., Zhejiang (CN)

( * ) Notice: Subject to any disclaimer, the term of this patent is extended or adjusted under 35 U.S.C. 154(b) by 261 days.

(21) Appl. No.: 18/334,628

(22) Filed: Jun. 14, 2023

(65) Prior Publication Data

US 2024/0002198 A1 Jan. 4, 2024

(30) Foreign Application Priority Data

Jun. 29, 2022 (CN) ......................... 202210749795.0
Jun. 29, 2022 (CN) ......................... 202221658116.0

(51) Int. Cl.
*B66D 1/22* (2006.01)
*B66D 1/12* (2006.01)

(52) U.S. Cl.
CPC . *B66D 1/22* (2013.01); *B66D 1/12* (2013.01)

(58) Field of Classification Search
CPC .................................... B66D 1/22; B66D 1/34
See application file for complete search history.

(56) References Cited

U.S. PATENT DOCUMENTS

| | | | | |
|---|---|---|---|---|
| 4,392,635 A * | 7/1983 | Muessel | F16D 3/26 | 464/902 |
| 4,565,352 A * | 1/1986 | Hasselmann | B66D 3/22 | 254/344 |
| 4,736,929 A * | 4/1988 | McMorris | B66D 1/22 | 254/323 |
| 2022/0212905 A1* | 7/2022 | Holdeman | F16H 1/46 | |

FOREIGN PATENT DOCUMENTS

| | | | |
|---|---|---|---|
| KR | 20100066342 A * | 6/2010 | B66D 1/12 |
| KR | 200469101 Y1 * | 9/2013 | B66D 1/34 |

* cited by examiner

*Primary Examiner* — Anna M Momper
*Assistant Examiner* — Nathaniel L Adams
(74) *Attorney, Agent, or Firm* — Bridgeway IP Law Group, PLLC; Jihun Kim

(57) ABSTRACT

A vehicle winch includes a motor assembly, a rope drum assembly, and a reducing gear assembly. The rope drum assembly defines a drum cavity extending in an axial direction of the rope drum assembly, and a part of the motor assembly is arranged in the drum cavity. The reducing gear assembly includes a primary planet gear train and a reducing gear train subassembly, the motor assembly, the primary planet gear train and the reducing gear train subassembly are sequentially arranged along the axial direction, the primary planet gear train is arranged in the drum cavity, and the primary planet gear train has an input end coupled to an output end of the motor assembly and an output end coupled to an input end of the reducing gear train subassembly, and the reducing gear train subassembly has an output end coupled to an input end of the rope drum assembly.

14 Claims, 7 Drawing Sheets

VEHICLE WINCH AND VEHICLE HAVING VEHICLE WINCH

CROSS-REFERENCE TO RELATED APPLICATIONS

This application claims priority to and benefits of Chinese Patent Application Serial No. 202210749795.0, filed with China National Intellectual Property Administration on Jun. 29, 2022, and Chinese Patent Application Serial No. 202221658116.0, filed with China National Intellectual Property Administration on Jun. 29, 2022, the entire content of which are incorporated herein by reference.

TECHNICAL FIELD

The present disclosure relates to a field of vehicle technologies, and more particularly, to a vehicle winch and a vehicle having the vehicle winch.

BACKGROUND

A winch is a winding drum with power, speed reduction and braking devices, which is mainly used in off-road vehicles, agricultural vehicles, yachts, fire rescue vehicles, road clearing vehicles, and other special vehicles. The winch generally includes a rope drum assembly and a driving motor. Under the control of the driving motor, the rope drum assembly winds a chain rope or releases the chain rope to realize the traction of heavy objects.

SUMMARY

A vehicle winch according to embodiments of the present disclosure includes a motor assembly, a rope drum assembly and a reducing gear assembly. The rope drum assembly defines a drum cavity extending in an axial direction of the rope drum assembly, a part of the motor assembly is arranged in the drum cavity. The reducing gear assembly includes a primary planet gear train and a reducing gear train subassembly, the motor assembly, the primary planet gear train and the reducing gear train subassembly are sequentially arranged along the axial direction of the rope drum assembly, the primary planet gear train is arranged in the drum cavity, the primary planet gear train has an input end coupled to an output end of the motor assembly and an output end coupled to an input end of the reducing gear train subassembly, and an output end of the reducing gear train subassembly is coupled to an input end of the rope drum assembly.

A vehicle according to embodiments of the present disclosure may include a vehicle winch. The vehicle winch includes a motor assembly, a rope drum assembly and a reducing gear assembly. The rope drum assembly defines a drum cavity extending in an axial direction of the rope drum assembly, a part of the motor assembly is arranged in the drum cavity. The reducing gear assembly includes a primary planet gear train and a reducing gear train subassembly, the motor assembly, the primary planet gear train and the reducing gear train subassembly are sequentially arranged along the axial direction of the rope drum assembly, the primary planet gear train is arranged in the drum cavity, the primary planet gear train has an input end coupled to an output end of the motor assembly and an output end coupled to an input end of the reducing gear train subassembly, and an output end of the reducing gear train subassembly is coupled to an input end of the rope drum assembly.

Figure 1:
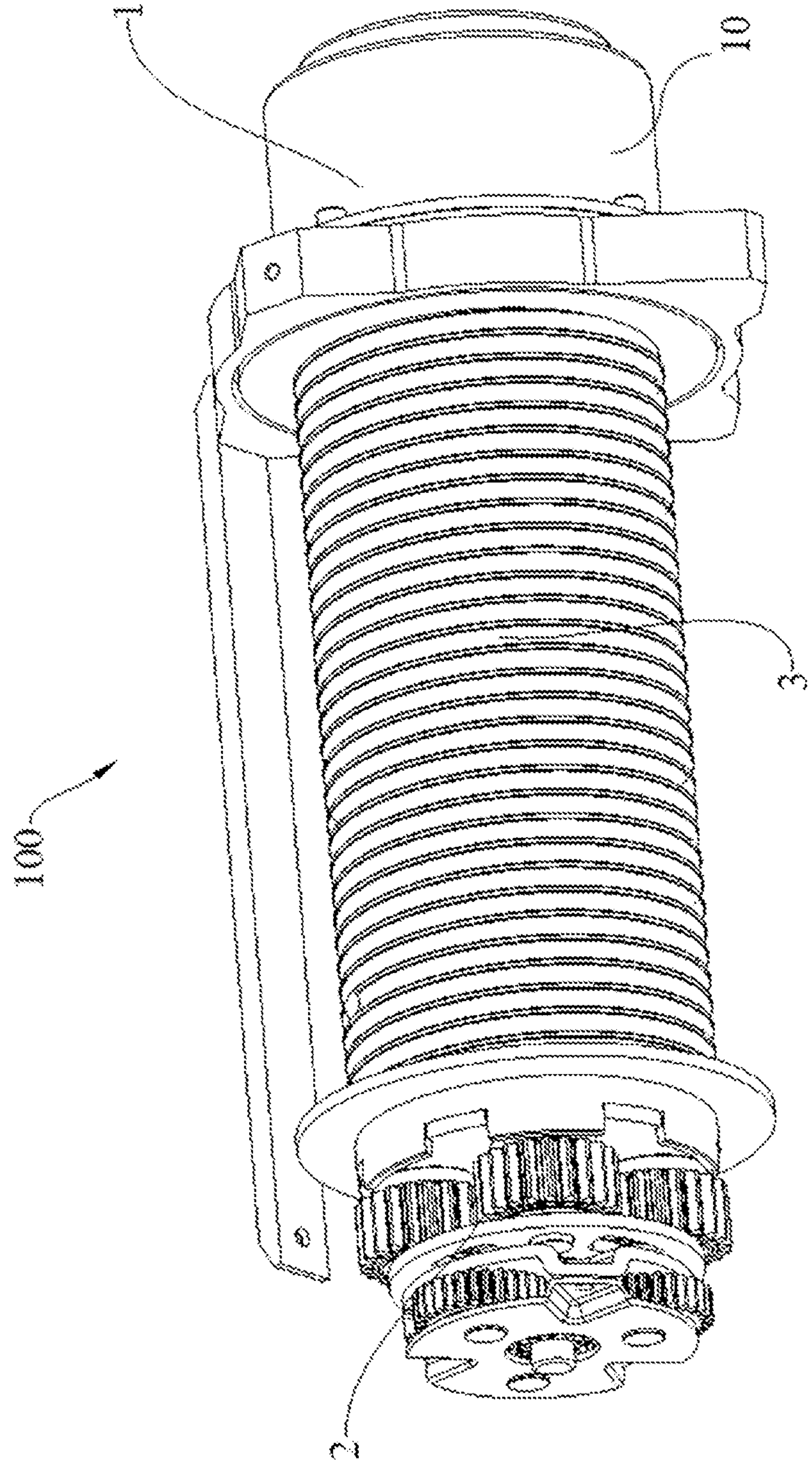
FIG. 1 is a perspective view of a vehicle winch according to an embodiment of the present disclosure, with a reduction casing being omitted.
Figure 2:
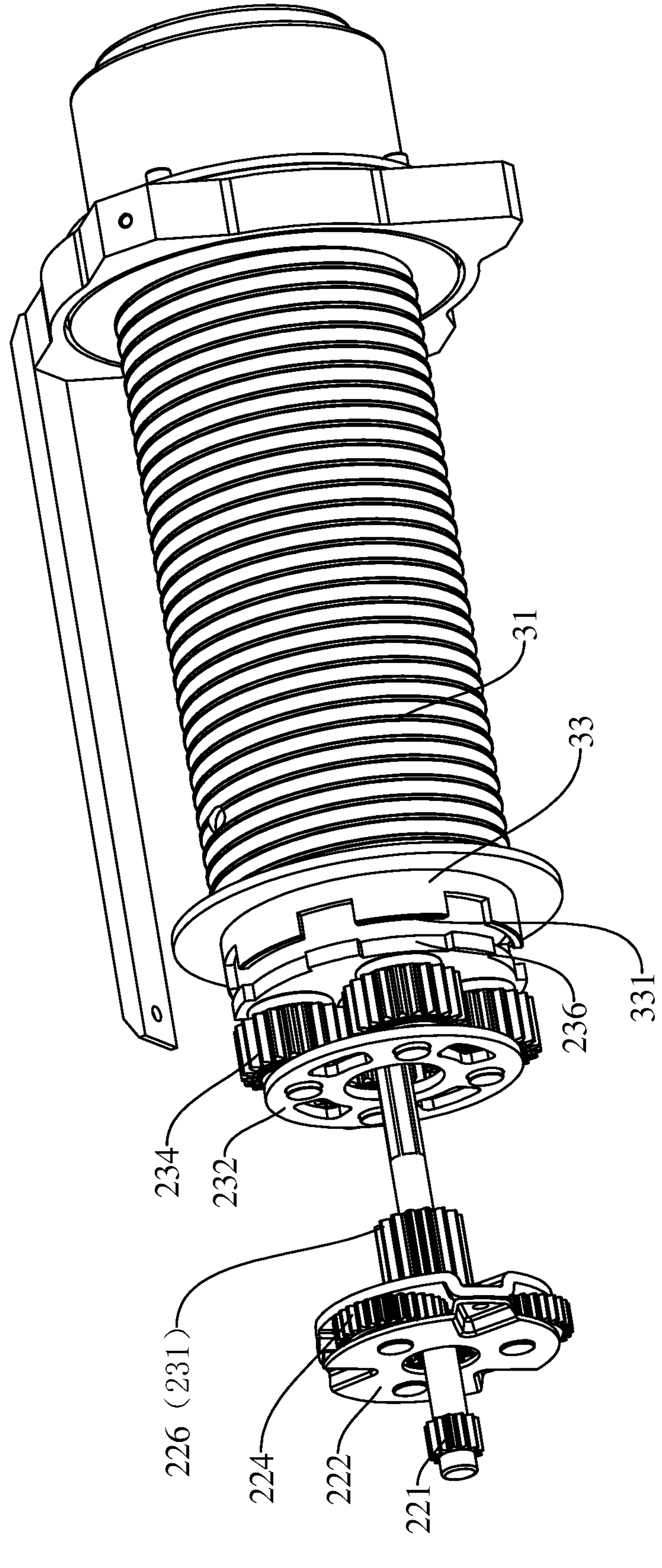
FIG. 2 is a partial exploded view of a vehicle winch according to an embodiment of the present disclosure, with a reduction casing being omitted.

REFERENCE NUMERALS vehicle winch 100;
motor assembly 1; housing 10; stator drum 11; rotor 12; drum cavity 13;
reducing gear assembly 2; primary planet gear train 21; primary sun gear 211; primary planet carrier 212; primary ring gear 213; primary planet gear 214; first fitting hole 215;
secondary planet gear train 22; secondary sun gear 221; secondary planet carrier 222; secondary ring gear 223; secondary planet gear 224; first fitting shaft 225; second fitting shaft 226; central hole 227;
tertiary planet gear train 23; tertiary sun gear 231; tertiary planet carrier 232; tertiary ring gear 233; tertiary planet gear 234; second fitting hole 235; limiting groove 236;
reduction casing 24;
rope drum assembly 3; drum body 31; first limiting plate 311; second limiting plate 312; first coupling portion 32; second coupling portion 33; limiting protrusion 331; inner liner ring 34.

DETAILED DESCRIPTION

In the related art, a motor is placed at an outer side of the rope drum assembly. Since the size of the vehicle winch is too large, an output shaft of the motor and the transmission of the speed reduction mechanism have problems of a large torque and an excessive large size.

Embodiments of the present disclosure are described in detail below, and examples of embodiments are illustrated in accompanying drawings. The following embodiments described with reference to the accompanying drawings are exemplary and are intended to explain the present disclosure and cannot be understood as limitations on the present disclosure.

A vehicle winch 100 according to embodiments of the present disclosure is described below with reference to FIGS. 1 to 7.

The vehicle winch 100 according to embodiments of the present disclosure includes a motor assembly 1, a rope drum assembly 3, and a reducing gear assembly 2.

The rope drum assembly 3 includes a drum body 31, and the drum body 31 defines a drum cavity 13 extending along an axial direction of the rope drum assembly 3. A part of the motor assembly 1 is arranged in the drum cavity 13, the drum body 31 has a cylindrical shape, and the reducing gear assembly includes a primary planet gear train 21 and a reducing gear train subassembly. The motor assembly 1, the primary planet gear train 21 and a reducing gear train subassembly are sequentially arranged along the axial direction of the rope drum assembly 3. The primary planet gear train 21 is arranged in the drum cavity 13. An input end of the primary planet gear train 21 is coupled to an output end of the motor assembly 1, an output end of the primary planet gear train 21 is coupled to an input end of the reducing gear train subassembly, and an output end of the reducing gear train subassembly is coupled to an input end of the rope drum assembly 3. In other words, the primary planet gear train 21 is arranged between the motor assembly 1 and the reducing gear train subassembly.

In the vehicle winch 100 according to embodiments of the present disclosure, by arranging the primary planet gear train 21 between the motor assembly 1 and the reducing gear train subassembly, a distance between an output shaft of the motor assembly 1 and the primary planet gear train 21 can be reduced, so that the torque between the output shaft of the motor assembly 1 and the primary planet gear train 21 is reduced and the requirement of load bearing capacity on the output shaft of the motor assembly 1 is reduced, thus reducing the production cost of the vehicle winch 100. In addition, by arranging a part of the motor assembly 1 and the primary planet gear train 21 in the rope drum assembly 3, an axial distance between the output shaft of the motor and the primary planet gear train 21 is further reduced, so that the requirement of load bearing on the output shaft of the motor is further reduced, thus further reducing the production cost of the vehicle winch 100. Moreover, the vacant space inside the rope drum assembly 3 is also fully utilized, and the size of the vehicle winch 100 in the axial direction can be reduced, thus achieving an advantage of improving the structural compactness of the vehicle winch 100.

Therefore, the vehicle winch 100 according to embodiments of the present disclosure has the advantages of compact structure and low production cost.

Figure 3:
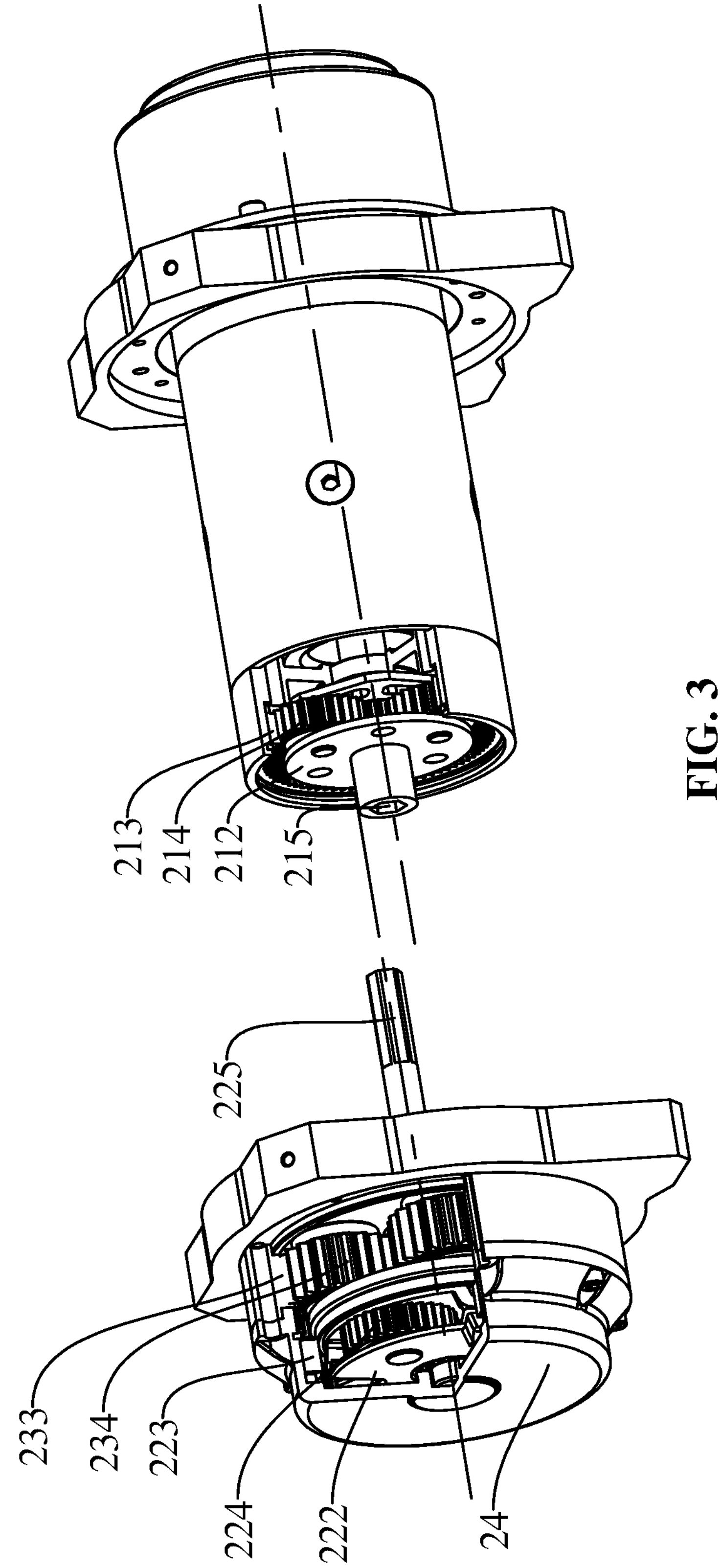
FIG. 3 is another partial exploded view of a vehicle winch according to an embodiment of the present disclosure.
Figure 5:
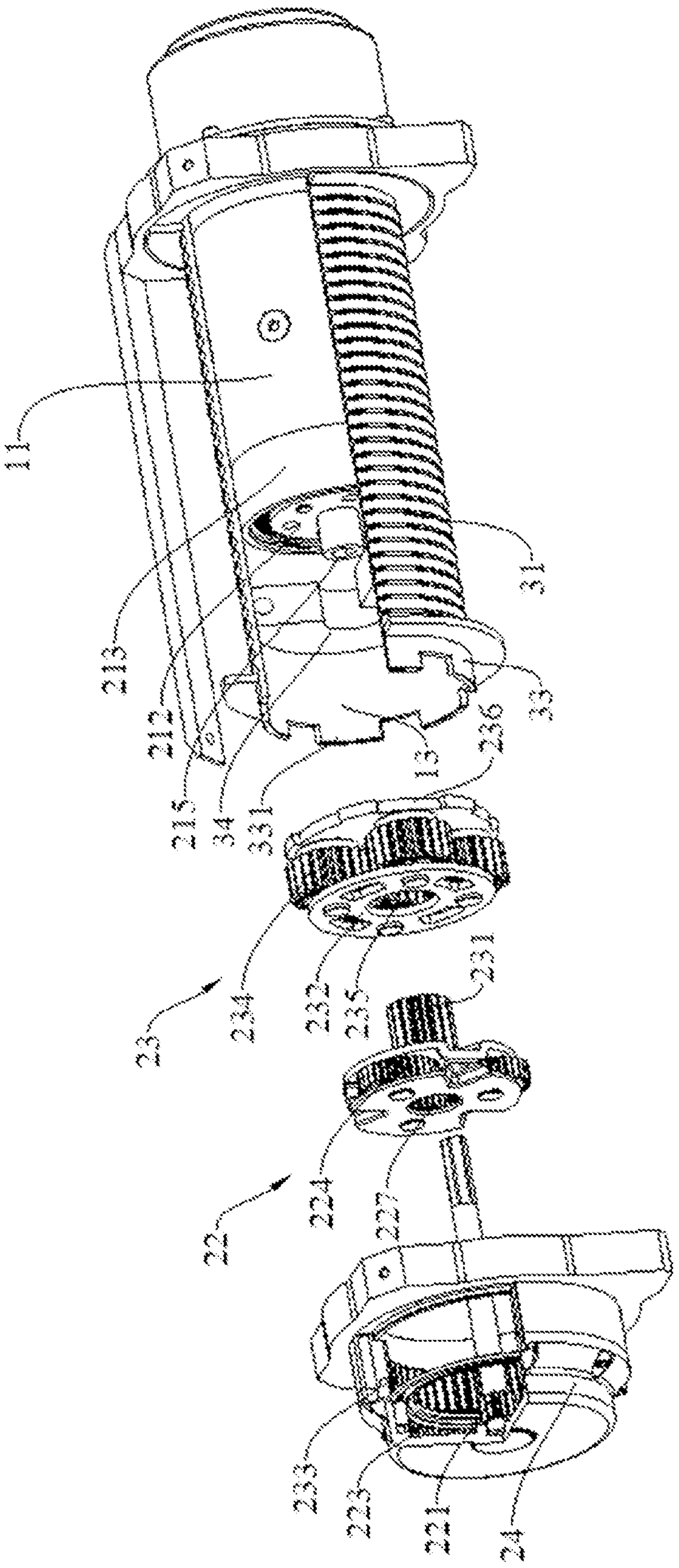
FIG. 5 is yet another exploded view of a vehicle winch according to an embodiment of the present disclosure.
Figure 6:
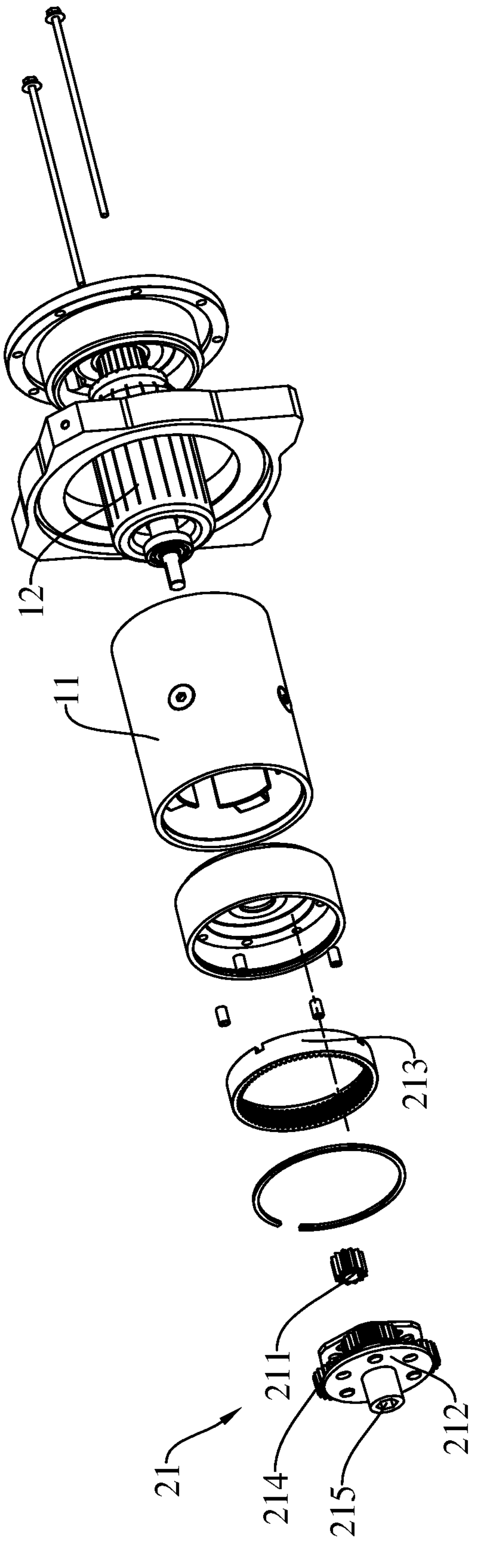
FIG. 6 is yet another exploded view of a motor assembly and a primary planet gear train according to an embodiment of the present disclosure.
Figure 7:
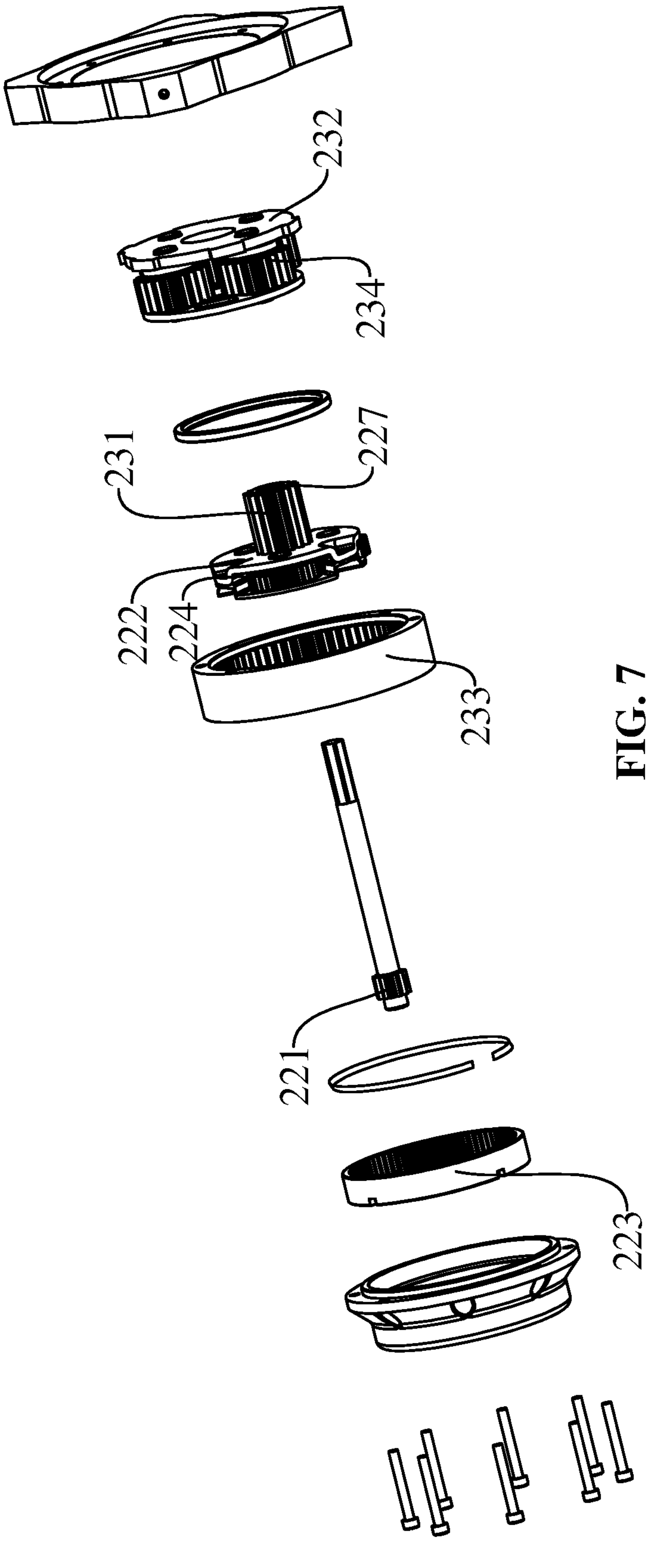
FIG. 7 is an exploded view of a reducing gear assembly and a motor assembly according to an embodiment of the present disclosure.

As illustrated in FIGS. 3, 5 and 6, the primary planet gear train 21 includes a primary sun gear 211, a primary planet carrier 212, a primary ring gear 213, and a plurality of primary planet gears 214. The plurality of primary planet gears 214 are spaced apart along a peripheral direction of the primary sun gear 211. Each primary planet gear 214 is meshed with each of the primary sun gear 211 and the primary ring gear 213, and the plurality of primary planet gears 214 are rotatably arranged on the primary planet carrier 212. The primary sun gear 211 is coupled to the output end of the motor assembly 1, and the primary ring gear 213 is coupled to the reducing gear train subassembly. In other words, the primary planet carrier 212 is the output end of the primary planet gear train 21, and the primary sun gear 211 is the input end of the primary planet gear train 21. It can be understood that the primary ring gear 213 is coupled to the rope drum assembly 3, the primary sun gear 211 is coupled to the output end of the motor assembly 1, the speed of the primary planet gear 214 is reduced by the primary ring gear 213, and the primary planet carrier 212 is coupled to the plurality of primary planet gears 214, so that the speed of the primary planet carrier 212 is reduced accordingly.

In the vehicle winch 100 according to embodiments of the present disclosure, by providing the primary planet carrier 212, the synchronization of the rotation of the plurality of primary planet gears 214 can be ensured, thus achieving the advantage of improving the structural stability and the reliability of the power transmission.

As illustrated in FIGS. 5 and 6, the motor assembly 1 includes a stator drum 11 and a rotor 12. The stator drum 11 is fitted over the rotor 12, and an end of the primary ring gear 213 is fixed to the stator drum 11.

In the vehicle winch 100 according to embodiments of the present disclosure, the end of the primary ring gear 213 is arranged on the stator drum 11, so that the distance between the primary planet gear train 21 and the reducing gear train subassembly is reduced, and then the distance between the output end on the primary planet carrier 212 and the reducing gear train subassembly is reduced. Therefore, the requirement on the bearing capacity of the output shaft between the output end on the primary planet carrier 212 and the reducing gear train subassembly is further reduced, thus achieving the advantage of further reducing the production cost of the vehicle winch 100.

As illustrated in FIGS. 3 and 5, the reducing gear train subassembly includes a secondary planet gear train 22. The secondary planet gear train 22 includes a secondary sun gear 221, a secondary planet carrier 222, a secondary ring gear 223, and a plurality of secondary planet gears 224. The plurality of secondary planet gears 224 are spaced apart along a peripheral direction of the secondary sun gear 221. Each secondary planet gear 224 is meshed with each of the secondary sun gear 221 and the secondary ring gear 223, and the plurality of secondary planet gears 224 are rotatably arranged on the secondary planet carrier 222. The secondary sun gear 221 is coupled to the primary planet carrier 212.

In the vehicle winch 100 according to embodiments of the present disclosure, the reducing gear train subassembly includes the secondary planet gear train 22, and the secondary planet gear train 22 is in cooperation with the primary planet gear train 21, so that the speed of the rope drum assembly 3 can be further reduced to prevent the problem of an excessively great speed of the winch. The plurality of secondary planet gears 224 are provided for the power transmission, thus achieving the advantages of high transmission stability and greatly increased transmission ratio.

Optionally, a plurality of secondary planet gears 224 are provided, a number of the secondary planet gears 224 may be three, and three secondary planet gears 224 are uniformly arranged along a peripheral direction of the secondary sun gear 221.

Specifically, the primary planet carrier 212 has one of a first fitting hole 215 and a first fitting shaft 225 both extending in the axial direction of the rope drum assembly 3, and the secondary sun gear 221 has the other of the first fitting shaft 225 and the first fitting hole 215 both extending in the axial direction of the rope drum assembly 3. The first fitting shaft 225 is arranged in the first fitting hole 215. In other words, the primary planet carrier 212 has the first fitting hole 215 extending in the axial direction of the rope drum assembly 3, and the secondary sun gear 221 has the first fitting shaft 225 extending in the axial direction of the rope drum assembly 3; or, the primary planet carrier 212 has the first fitting shaft 225 extending in the axial direction of the rope drum assembly 3, and the secondary sun gear 221 has the first fitting hole 215 extending in the axial direction of the rope drum assembly 3.

In the vehicle winch 100 according to embodiments of the present disclosure, the primary planet carrier 212 and the secondary sun gear 221 are in cooperation with each other through the first fitting hole 215 and the first fitting shaft 225, thus achieving the advantages of simple structure and high smoothness of rotation fitting.

The secondary planet carrier 222 is an output end of the reducing gear assembly 2 and is coupled to the rope drum assembly 3, thus achieving the advantages of the simple structure and the high compactness.

The present disclosure is not limited to this. In some embodiments, as illustrated in FIGS. 3 and 5, the reducing gear train subassembly further includes a tertiary planet gear train 23. The primary planet gear train 21, the tertiary planet gear train 23 and the secondary planet gear train 22 are sequentially arranged along the axial direction of the rope drum assembly 3. The tertiary planet gear train 23 includes a tertiary sun gear 231, a tertiary planet carrier 232, a tertiary ring gear 233 and a plurality of tertiary planet gears 234. The plurality of tertiary planet gears 234 are spaced apart along a peripheral direction of the tertiary sun gear 231. Each tertiary planet gear 234 is meshed with each of the tertiary sun gear 231 and the tertiary ring gear 233, and the plurality of tertiary planet gears 234 are rotatably arranged on the tertiary planet carrier 232. The tertiary planet carrier 232 is the output end of the reducing gear assembly 2 and is coupled to the rope drum assembly 3. The secondary planet carrier 222 is coupled to the tertiary sun gear 231.

It can be understood that a rotation center line of the primary planet gear train 21, a rotation center line of the secondary planet gear train 22 and a rotation center line of the tertiary planet gear train 23 are on a same straight line, and the speed of the rope drum assembly 3 is reduced through the primary planet gear train 21, the secondary planet gear train 22 and the tertiary planet gear train 23.

In the vehicle winch 100 according to embodiments of the present disclosure, the speed of the rope drum assembly 3 can be further reduced by providing the tertiary planet gear train 23, which is conducive to realizing the low-speed retraction and release of a traction rope by controlling the rope drum assembly 3 and the structural compactness. In addition, the primary planet gear train 21, the secondary planet gear train 22, and the tertiary planet gear train 23 are provided for the power transmission, thus achieving the advantages of the high transmission efficiency and the good smoothness.

Specifically, the secondary planet carrier 222 has one of a second fitting hole 235 and a second fitting shaft 226 both extending in the axial direction of the rope drum assembly 3, the tertiary sun gear 231 has the other of the second fitting shaft 226 and the second fitting hole 235 both extending in the axial direction of the rope drum assembly 3, the second fitting shaft 226 is arranged in the second fitting hole 235, and the second fitting shaft 226 has a central hole 227 through which the first fitting shaft 225 passes.

Figure 4:
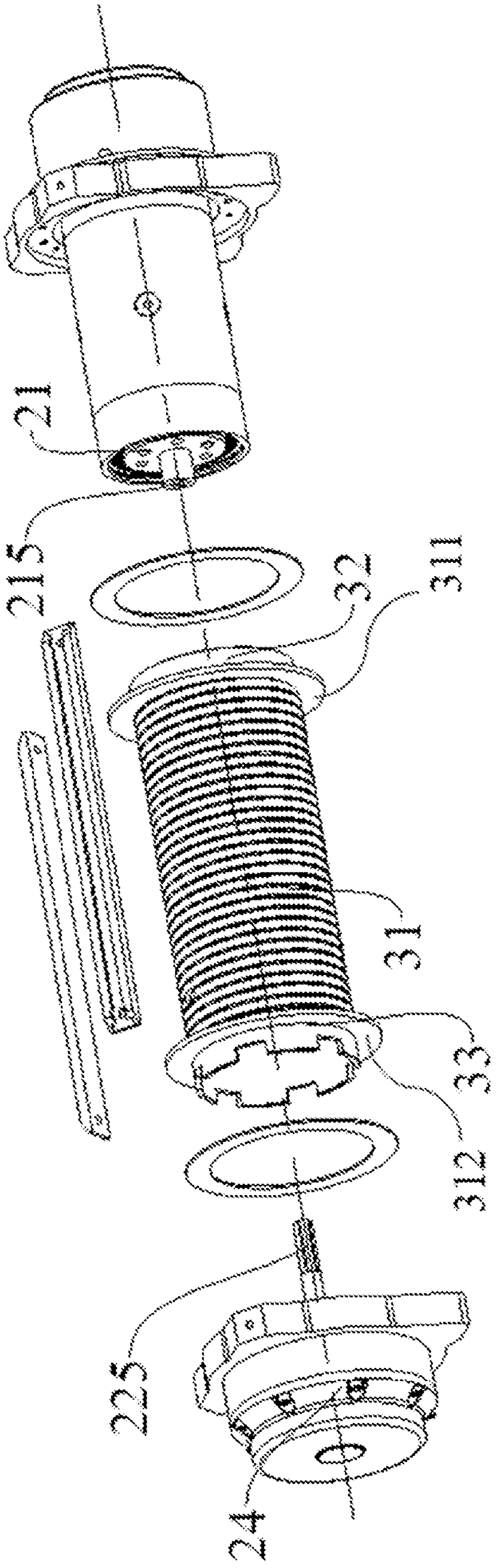
FIG. 4 is still another exploded view of a vehicle winch according to an embodiment of the present disclosure.

As illustrated in FIGS. 4 and 5, the rope drum assembly 3 further includes a first coupling portion 32 and a second coupling portion 33, and the first coupling portion 32 and the second coupling portion 33 are respectively arranged at two ends of the drum body 31. The motor assembly 1 further includes a housing 10, the first coupling portion 32 is rotatably coupled to the housing 10, and the second coupling portion 33 is coupled to the tertiary planet carrier 232. It can be understood that the motor assembly 1 and the reducing gear train subassembly are arranged at two ends of the rope drum assembly 3.

In the vehicle winch 100 according to embodiments of the present disclosure, by providing the first coupling portion 32 and the second coupling portion 33, the efficiency of the rotation fitting between the coupling portions and the corresponding components can be ensured. In addition, the motor assembly 1 and the reducing gear train subassembly are respectively arranged at two ends of the rope drum assembly 3, which have the function of distributing and balancing the weight of two ends of the rope drum assembly 3, thus avoiding the problem of tipping due to an uneven stress of the traction rope during the retracting and releasing caused by the excessive lightness of one end of the rope drum assembly.

Optionally, a surface of the drum body 31 may be provided with anti-skid grain or an anti-skid rubber sleeve.

Optionally, for example, as illustrated in FIG. 4, the drum body 31 is further provided with a first limiting plate 311 and a second limiting plate 312, the first limiting plate 311 is arranged at a joint of the drum body 31 and the first coupling portion 32, and the second limiting plate 312 is arranged at a joint of the drum body 31 and the second coupling portion 33. In the vehicle winch 100 according to embodiments of the present disclosure, the rope drum assembly 3 can be limited by the first limiting plate 311 and the second limiting plate 312, thus preventing the drum body 31 from shaking in the axial direction, and achieving the advantage of improving the stability of the rope drum assembly 3.

As illustrated in FIGS. 4 and 5, an outer periphery of the tertiary planet carrier 232 is provided with one of a limiting groove 236 and the limiting protrusion 331, the second coupling portion 33 is provided with the other of the limiting protrusion 331 and the limiting groove 236, and the limiting protrusion 331 is arranged in the limiting groove 236. In other words, the outer periphery of the tertiary planet carrier 232 is provided with the limiting groove 236, and the second coupling portion 33 is provided with the limiting protrusion 331; or the outer periphery of the tertiary planet carrier 232 is provided with the limiting protrusion 331 and the second coupling portion 33 is provided with the limiting groove 236.

In the vehicle winch 100 according to embodiments of the present disclosure, the tertiary planet carrier 232 and the second coupling portion 33 are limited by the limiting groove 236 and the limiting protrusion 331, thus achieving the advantage of easy installation.

As illustrated in FIGS. 1 and 5, the reducing gear train subassembly further includes a reduction casing 24, and both the secondary ring gear 223 and the tertiary ring gear 233 are arranged in the reduction casing 24.

In the vehicle winch 100 according to embodiments of the present disclosure, a limiting effect on the secondary ring gear 223 and the tertiary ring gear 233 can be achieved by providing the reduction casing 24. In addition, the secondary planet gear train 22 and the tertiary planet gear train 23 are arranged in the reduction casing 24, thus achieving the advantage of low vibration and noise.

As illustrated in FIGS. 1 and 5, the rope drum assembly 3 further includes an inner liner ring 34, the drum body 31 is fitted over the inner liner ring 34, and the inner liner ring 34 is provided with a fixing portion configured to fix the traction rope.

In the vehicle winch 100 according to embodiments of the present disclosure, the inner liner ring 34 is arranged in the rope drum assembly 3, thus achieving the advantage of saving space.

A vehicle according to embodiments of the present disclosure includes a vehicle winch 100 according to any one of the above embodiments.

A vehicle winch according to embodiments of the present disclosure includes a motor assembly, a rope drum assembly and a reducing gear assembly. The rope drum assembly defines a drum cavity extending in an axial direction of the rope drum assembly, a part of the motor assembly is arranged in the drum cavity. The reducing gear assembly includes a primary planet gear train and a reducing gear train subassembly, the motor assembly, the primary planet gear train and the reducing gear train subassembly are sequentially arranged along the axial direction of the rope drum assembly, the primary planet gear train is arranged in the drum cavity, the primary planet gear train has an input end coupled to an output end of the motor assembly and an output end coupled to an input end of the reducing gear train subassembly, and an output end of the reducing gear train subassembly is coupled to an input end of the rope drum assembly. In other words, the primary planet gear train is arranged between the motor assembly and the reducing gear train subassembly.

In the vehicle winch according to embodiments of the present disclosure, by arranging the primary planet gear train between the motor assembly and the reducing gear train subassembly, a distance between the output shaft of the motor assembly and the primary planet gear train can be reduced, so that the torque between the output shaft of the motor assembly and the primary planet gear train is reduced and the requirement of load bearing on the output shaft of the motor assembly is reduced, thus reducing the production cost of the vehicle winch. In addition, by arranging a part of the motor assembly and the primary planet gear train in the rope drum assembly, an axial distance between the output shaft of the motor and the primary planet gear train is further reduced, so that the requirement of load bearing on the output shaft of the motor assembly is further reduced, thus further reducing the production cost of the vehicle winch. Moreover, the vacant space inside the rope drum assembly is fully utilized. Meanwhile, the part of the motor assembly is arranged in the rope drum assembly, so that the size of the vehicle winch in the axial direction can be reduced, thus achieving the advantage of improving the structural compactness.

Therefore, the vehicle winch according to embodiments of the present disclosure has the advantages of compact structure and low production cost.

In some embodiments, the primary planet gear train includes a primary sun gear, a primary planet carrier, a primary ring gear and a plurality of primary planet gears, the plurality of primary planet gears are spaced apart along a peripheral direction of the primary sun gear, each of the primary planet gears is meshed with each of the primary sun gear and the primary ring gear, the plurality of the primary planet gears are rotatably arranged on the primary planet carrier, the primary sun gear is coupled to the output end of the motor assembly, and the primary ring gear is coupled to the reducing gear train subassembly.

In some embodiments, the motor assembly includes a stator drum and a rotor, the stator drum is fitted over the rotor, and the primary ring gear has an end fixed on the stator drum.

In some embodiments, the reducing gear train subassembly includes a secondary planet gear train, the secondary planet gear train includes a secondary sun gear, a secondary planet carrier, a secondary ring gear and a plurality of secondary planet gears, the plurality of secondary planet gears is spaced apart along a peripheral direction of the secondary sun gear, each of the secondary planet gears is meshed with each of the secondary sun gear and the secondary ring gear, the plurality of the secondary planet gears are rotatably arranged on the secondary planet carrier, and the secondary sun gear is coupled to the primary planet carrier.

In some embodiments, the primary planet carrier has one of a first fitting hole and a first fitting shaft both extending in the axial direction of the rope drum assembly, and the secondary sun gear has the other of the first fitting shaft and the first fitting hole both extending in the axial direction of the rope drum assembly. The first fitting shaft is arranged in the first fitting hole.

In some embodiments, the secondary planet carrier is an output end of the reducing gear assembly and coupled to the rope drum assembly.

In some embodiments, the reducing gear train subassembly further includes a tertiary planet gear train, the primary planet gear train, the tertiary planet gear train and the secondary planet gear train are sequentially arranged along the axial direction of the rope drum assembly, the tertiary planet gear train includes a tertiary sun gear, a tertiary planet carrier, a tertiary ring gear and a plurality of tertiary planet gears, the plurality of the tertiary planet gears are spaced apart along a peripheral direction of the tertiary sun gear, each of the tertiary planet gears is meshed with each of the tertiary sun gear and the tertiary ring gear, the plurality of the tertiary planet gears are rotatably arranged on the tertiary planet carrier, the tertiary planet carrier is the output end of the reducing gear assembly and coupled to the rope drum assembly, and the secondary planet carrier is coupled to the tertiary sun gear.

In some embodiments, the secondary planet carrier has one of a second fitting hole and a second fitting shaft both extending in the axial direction of the rope drum assembly, the tertiary sun gear has the other of the second fitting shaft and the second fitting hole both extending in the axial direction of the rope drum assembly, the second fitting shaft is arranged in the second fitting hole, and the second fitting shaft has a central hole through which the first fitting shaft passes.

In some embodiments, the rope drum assembly further includes a drum body, a first coupling portion and a second coupling portion, the first coupling portion and the second coupling portion are respectively arranged at two ends of the drum body, the motor assembly further includes a housing, the first coupling portion is rotatably coupled to the housing, and the second coupling portion is coupled to the tertiary planet carrier.

In some embodiments, an outer periphery of the tertiary planet carrier is provided with one of a limiting groove and a limiting protrusion, and the second coupling portion is provided with the other of the limiting protrusion and the limiting groove, and the limiting protrusion is arranged in the limiting groove.

In some embodiments, the reducing gear train subassembly further includes a reduction casing, and both the secondary ring gear and the tertiary ring gear are arranged in the reduction casing.

In some embodiments, the rope drum assembly further includes an inner liner ring, the drum body is fitted over the inner liner ring, and the inner liner ring is provided with a fixing portion configured to fix a traction rope.

In some embodiments, the rope drum includes a drum body defining the drum cavity, the drum body has a cylindrical shape, and at least a part of the motor assembly is arranged in the drum cavity.

In some embodiments, the primary planet gear train includes a primary sun gear, a primary planet carrier, a primary ring gear and a plurality of primary planet gears, the plurality of primary planet gears are spaced apart along a peripheral direction of the primary sun gear, each of the primary planet gears is meshed with each of the primary sun gear and the primary ring gear, the plurality of the primary planet gears are rotatably arranged on the primary planet carrier, the primary sun gear is coupled to the output end of the motor assembly, and the primary ring gear is coupled to the reducing gear train subassembly.

In some embodiments, the motor assembly includes a stator drum and a rotor, the stator drum is fitted over the rotor, and the primary ring gear has an end fixed on the stator drum.

In some embodiments, the reducing gear train subassembly includes a secondary planet gear train, the secondary planet gear train includes a secondary sun gear, a secondary planet carrier, a secondary ring gear and a plurality of secondary planet gears, the plurality of secondary planet gears is spaced apart along a peripheral direction of the secondary sun gear, each of the secondary planet gears is meshed with each of the secondary sun gear and the secondary ring gear, the plurality of the secondary planet gears are rotatably arranged on the secondary planet carrier, and the secondary sun gear is coupled to the primary planet carrier.

In some embodiments, the secondary planet carrier is an output end of the reducing gear assembly and coupled to the rope drum assembly.

In some embodiments, the reducing gear train subassembly further includes a tertiary planet gear train, the primary planet gear train, the tertiary planet gear train and the secondary planet gear train are sequentially arranged along the axial direction of the rope drum assembly, the tertiary planet gear train includes a tertiary sun gear, a tertiary planet carrier, a tertiary ring gear and a plurality of tertiary planet gears, the plurality of the tertiary planet gears are spaced apart along a peripheral direction of the tertiary sun gear, each of the tertiary planet gears is meshed with each of the tertiary sun gear and the tertiary ring gear, the plurality of the tertiary planet gears are rotatably arranged on the tertiary planet carrier, the tertiary planet carrier is the output end of the reducing gear assembly and coupled to the rope drum assembly, and the secondary planet carrier is coupled to the tertiary sun gear.

In some embodiments, the rope drum assembly further includes a first coupling portion and a second coupling portion, the first coupling portion and the second coupling portion are respectively arranged at two ends of the drum body, the motor assembly further includes a housing, the first coupling portion is rotatably coupled to the housing, and the second coupling portion is coupled to the tertiary planet carrier.

In some embodiments, an outer periphery of the tertiary planet carrier is provided with one of a limiting groove and a limiting protrusion, and the second coupling portion is provided with the other of the limiting protrusion and the limiting groove, and the limiting protrusion is arranged in the limiting groove.

In some embodiments, the rope drum assembly further includes an inner liner ring, the drum body is fitted over the inner liner ring, and the inner liner ring is provided with a fixing portion configured to fix a traction rope.

A vehicle according to embodiments of the present disclosure may include a vehicle winch according to any one of the above embodiments.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "peripheral" should be construed to refer to the orientation and position as then described or as illustrated in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms "first" and "second" are only used for descriptive purposes and cannot be understood as indicating or implying relative importance or implicitly indicating the number of indicated technical features. Thus, the features defined by "first" and "second" may include at least one of the features explicitly or implicitly. In the description of the present disclosure, "a plurality of" means at least two such as two or three, unless otherwise expressly and specifically defined.

In the present disclosure, unless otherwise expressly defined, terms such as "mounting," "interconnection," "connection," "fixing" shall be understood broadly, and may be, for example, fixed connections, detachable connections, or integral connections; may also be mechanical or electrical connections or intercommunication; may also be direct connections or indirect connections via intervening media; may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature, while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although embodiments of the present disclosure have been illustrated and described above, it can be understood that the above embodiments are exemplary and shall not be understood as limitation to the present disclosure, and changes, modifications, alternatives and variations can be made in the above embodiments within the scope of the present disclosure by those skilled in the art.

What is claimed is:

1. A vehicle winch, comprising:

a motor assembly;

a rope drum assembly having a drum cavity extending in an axial direction of the rope drum assembly, a part of the motor assembly being arranged in the drum cavity; and a reducing gear assembly comprising a primary planet gear train and a reducing gear train subassembly, the motor assembly, the primary planet gear train, and the reducing gear train subassembly being sequentially arranged along the axial direction of the rope drum assembly, the primary planet gear train being arranged in the drum cavity and having an input end coupled to an output end of the motor assembly and an output end coupled to an input end of the reducing gear train subassembly, an output end of the reducing gear train subassembly being coupled to an input end of the rope drum assembly, wherein the reducing gear train subassembly comprises a secondary planet gear train, the secondary planet gear train comprising:

a secondary sun gear, a secondary planet carrier, a secondary ring gear, and a plurality of secondary planet gears, the plurality of secondary planet gears being spaced apart along a peripheral direction of the secondary sun gear, each secondary planet gear being configured to be meshed with each of the secondary sun gear and the secondary ring gear, the plurality of secondary planet gears being rotatably arranged on the secondary planet carrier, the secondary sun gear being coupled to a primary planet carrier of the primary planet gear train, wherein the reducing gear train subassembly further comprises a tertiary planet gear train, wherein the primary planet gear train, the tertiary planet gear train and the secondary planet gear train are sequentially arranged along the axial direction of the rope drum assembly, and wherein the tertiary planet gear train comprises:

a tertiary sun gear, a tertiary planet carrier, a tertiary ring gear, and a plurality of tertiary planet gears, the plurality of tertiary planet gears being spaced apart along a peripheral direction of the tertiary sun gear, each tertiary planet gear being configured to be meshed with each of the tertiary sun gear and the tertiary ring gear, the plurality of tertiary planet gears being rotatably arranged on the tertiary planet carrier, the tertiary planet carrier being an output end of the reducing gear assembly and coupled to the rope drum assembly, the secondary planet carrier being coupled to the tertiary sun gear.

2. The vehicle winch according to claim 1, wherein the primary planet gear train comprises:

a primary sun gear, the primary planet carrier, a primary ring gear, and a plurality of primary planet gears spaced apart along a peripheral direction of the primary sun gear, each primary planet gear being configured to be meshed with each of the primary sun gear and the primary ring gear, the plurality of primary planet gears being rotatably arranged on the primary planet carrier, the primary sun gear being coupled to the output end of the motor assembly, the primary ring gear being coupled to the reducing gear train subassembly.

3. The vehicle winch according to claim 2, wherein the motor assembly comprises a stator drum and a rotor, the stator drum being fitted over the rotor, the primary ring gear having an end fixed on the stator drum.

4. The vehicle winch according to claim 1, wherein the rope drum assembly further comprises:

a drum body, a first coupling portion, and a second coupling portion, the first coupling portion and the second coupling portion being respectively arranged at two ends of the drum body, wherein the motor assembly further comprises a housing, the first coupling portion being rotatably coupled to the housing, the second coupling portion being coupled to the tertiary planet carrier.

5. The vehicle winch according to claim 4, wherein an outer periphery of the tertiary planet carrier includes one of a limiting groove and a limiting protrusion, and the second coupling portion includes a corresponding one of the limiting protrusion and the limiting groove, and the limiting protrusion is arranged in the limiting groove.

6. The vehicle winch according to claim 4, wherein the rope drum assembly further comprises an inner liner ring, the drum body is fitted over the inner liner ring, and the inner liner ring includes a fixing portion configured to fix a traction rope.

7. The vehicle winch according to claim 1, wherein the rope drum assembly comprises a drum body defining the drum cavity, the drum body has a cylindrical shape, and at least the part of the motor assembly is arranged in the drum cavity.

8. The vehicle winch according to claim 7, wherein the primary planet gear train comprises:

a primary sun gear, the primary planet carrier, a primary ring gear, and a plurality of primary planet gears, the plurality of primary planet gears being spaced apart along a peripheral direction of the primary sun gear, each primary planet gear being configured to be meshed with each of the primary sun gear and the primary ring gear, the plurality of primary planet gears being rotatably arranged on the primary planet carrier, the primary sun gear being coupled to the output end of the motor assembly, and the primary ring gear being coupled to the reducing gear train subassembly.

9. The vehicle winch according to claim 8, wherein the motor assembly comprises a stator drum and a rotor, the stator drum being fitted over the rotor, the primary ring gear having an end fixed on the stator drum.

10. The vehicle winch according to claim 7, wherein the rope drum assembly further comprises a first coupling portion and a second coupling portion, wherein the first coupling portion and the second coupling portion are respectively arranged at two ends of the drum body, wherein the motor assembly further comprises a housing, wherein the first coupling portion is rotatably coupled to the housing, and the second coupling portion is coupled to the tertiary planet carrier.

11. The vehicle winch according to claim 10, wherein an outer periphery of the tertiary planet carrier includes one of a limiting groove and a limiting protrusion, and the second coupling portion includes a corresponding one of the limiting protrusion and the limiting groove, and the limiting protrusion is arranged in the limiting groove.

12. The vehicle winch according to claim 10, wherein the rope drum assembly further comprises an inner liner ring, the drum body is fitted over the inner liner ring, and the inner liner ring includes a fixing portion configured to fix a traction rope.

13. A vehicle, comprising:

a vehicle winch comprising:

a motor assembly;

a rope drum assembly having a drum cavity extending in an axial direction of the rope drum assembly, a part of the motor assembly being arranged in the drum cavity; and a reducing gear assembly comprising a primary planet gear train and a reducing gear train subassembly, the motor assembly, the primary planet gear train, and the reducing gear train subassembly being sequentially arranged along the axial direction of the rope drum assembly, the primary planet gear train being arranged in the drum cavity and having an input end coupled to an output end of the motor assembly and an output end coupled to an input end of the reducing gear train subassembly, an output end of the reducing gear train subassembly being coupled to an input end of the rope drum assembly, wherein the reducing gear train subassembly comprises a secondary planet gear train, the secondary planet gear train comprising:

a secondary sun gear, a secondary planet carrier, a secondary ring gear, and a plurality of secondary planet gears, the plurality of secondary planet gears being spaced apart along a peripheral direction of the secondary sun gear, each secondary planet gear being configured to be meshed with each of the secondary sun gear and the secondary ring gear, the plurality of secondary planet gears being rotatably arranged on the secondary planet carrier, the secondary sun gear being coupled to a primary planet carrier of the primary planet gear train, wherein the reducing gear train subassembly further comprises a tertiary planet gear train, wherein the primary planet gear train, the tertiary planet gear train and the secondary planet gear train are sequentially arranged along the axial direction of the rope drum assembly, and wherein the tertiary planet gear train comprises:

a tertiary sun gear, a tertiary planet carrier, a tertiary ring gear, and a plurality of tertiary planet gears, the plurality of tertiary planet gears being spaced apart along a peripheral direction of the tertiary sun gear, each tertiary planet gear being configured to be meshed with each of the tertiary sun gear and the tertiary ring gear, the plurality of tertiary planet gears being rotatably arranged on the tertiary planet carrier, the tertiary planet carrier being an output end of the reducing gear assembly and coupled to the rope drum assembly, the secondary planet carrier being coupled to the tertiary sun gear.

14. The vehicle according to claim 13, wherein the rope drum assembly comprises a drum body defining the drum cavity, the drum body has a cylindrical shape, and at least the part of the motor assembly is arranged in the drum cavity.

* * * * *